United States Patent [19]

Mills et al.

[11] Patent Number: 5,596,327

[45] Date of Patent: Jan. 21, 1997

[54] RADAR ENCODER

[75] Inventors: George T. Mills; Albert T. Gabaldon, Jr., both of Ridgecrest, Calif.

[73] Assignee: The United States of America as represented by the Secretary of the Navy, Washington, D.C.

[21] Appl. No.: 554,620

[22] Filed: Nov. 6, 1995

[51] Int. Cl.$^6$ ...................................................... G01S 7/295
[52] U.S. Cl. ............................ 342/195; 342/197; 342/58; 341/143
[58] Field of Search ..................................... 342/195, 197, 342/58, 60; 341/143

[56] References Cited

U.S. PATENT DOCUMENTS

| | | | |
|---|---|---|---|
| 4,338,626 | 7/1982 | Lemelson | 358/93 |
| 4,833,475 | 5/1989 | Pease et al. | 342/185 |
| 4,845,501 | 7/1989 | Pease et al. | 342/185 |
| 4,983,972 | 1/1991 | Mills | 341/143 |
| 5,097,268 | 3/1992 | Bauer, Jr. et al. | 342/160 |

*Primary Examiner*—John B. Sotomayor
*Attorney, Agent, or Firm*—David S. Kalmbaugh; Melvin J. Sliwka; John Forrest, Jr.

[57] ABSTRACT

A radar encoder comprising a delta modulation circuit which receives analog radar video data from a radar and then converts the data to digitized NRZL video data. The radar encoder also has an encoder circuit which receives the digitized NRZL video data as well as a trigger pulse signal and analog synchro signals from the radar. The synchro signals are provided to a Synchro-to-Digital Converter which converts the synchro signals to sixteen digital synchro data bits which are then latched into the converter. The synchro data bits are next parallel transferred to a pair of shift registers and then clocked in a serial format to a multiplexer. The multiplexer also receives the digitized NRZL video data supplied to the encoder circuit. A state machine, in response to the trigger pulse signal, generates control signals to latch the synchro data bits into the converter and then effect the parallel transfer of the synchro data bits from the converter to the shift registers. The state machine also supplies control signals to the multiplexer allowing the multiplexer to first pass therethrough sixteen logic ones, followed by four logic zeros and four logic ones forming a frame sync. The multiplexer will next pass the sixteen synchro data bits therethrough followed by eight logic zeros. After the first forty eight bits of digitized data passes through the multiplexer in a serial format, the state machine provides a control signal which allows the digitized NRZL video data to pass through the multiplexer.

20 Claims, 7 Drawing Sheets

RADAR ENCODER

BACKGROUND OF THE INVENTION

1. Field of the Invention

The present invention relates generally to radar systems. More particularly, the present invention relates to an encoder circuit which receives radar video data and encodes the radar video data to provide Non-Return-To-Zero-Level (NRZL) Data which is then supplied to an encryption unit for encryption by the encryption unit.

2. Description of the Prior Art

The military often locates a ground based radar at a site which is remote from the receiving station where the data from the radar is processed and then observed on radar video display screen. The distance between the ground based radar and the receiving station may be several miles which often requires that the radar data be transmitted over public lands via, for example, fiber optic cables. Since data from the ground based radar generally includes classified information there is a need to protect the data during the transmission thereof over the fiber optic cables linking the ground based radar to the receiving station. This requires that the radar data, which is generally in an analog format, be digitized for compatibility with digital formatted encryption units, such as the KG194 encryption unit, currently being utilized by the United States Armed Forces.

The encrypted data is next transmitted via the fiber optic cable to the receiving station where it is un-encrypted by a second encryption unit and then provided in a digital format for processing and then display on a radar video display screen. The digitized radar data is then converted to an analog format which is compatible with the radar video display screen.

It is therefore an object of the present invention to provide to digitize analog radio video data into an NRZL data format which is compatible with an encryption unit.

It is another object of the present invention to generate a frame synch signal in response to a radar trigger pulse received from a radar.

It is yet another object of the present invention to provide a serial data stream which includes a frame sync signal, synchro data and digitized radar video data.

Other objects, advantages and novel features of the present invention will become apparent to those skilled in the art after reviewing the following detailed description of the preferred embodiment in conjunction with all of the figures of the drawings.

SUMMARY OF THE INVENTION

The present invention overcomes some of the disadvantages of the prior art including those mentioned above in that it comprises a radar encoder circuit for converting analog radar signals comprising a trigger pulse signal, synchro signals and radar video signals into a serial digital data stream that includes sufficient information so that the original analog radar signals can be regenerated at a receiving station.

The radar encoder has a delta modulation circuit which receives analog radar video data from a remote site radar and then converts the data to digitized NRZL video data using Delta Modulation which is a one bit pulse-code modulation for digitizing an analog signal.

The radar encoder also has an encoder circuit which receives the digitized NRZL video data as well as a trigger pulse signal and analog synchro signals from the radar. The synchro signals are provided to a Synchro-to-Digital Converter which converts the analog synchro signals to sixteen digital synchro data bits which are then latched into the converter. The synchro data bits are next parallel transferred to a pair of shift registers and then clocked in a serial format to a multiplexer within the encoder circuit. The multiplexer also receives the digitized NRZL video data supplied to the encoder circuit.

A state machine within the encoder circuit, in response to the trigger pulse signal, generates control signals which are supplied to the Synchro-to-Digital Converter and the shift register to latch the synchro data bits into the converter and then effect the parallel transfer of the synchro data bits from the converter to the shift registers.

The state machine also supplies control signals to the multiplexer allowing the multiplexer to first pass therethrough sixteen logic ones, followed by four logic zeros and four logic ones to form a frame sync. The multiplexer will next pass the sixteen synchro data bits therethrough followed by eight logic zeros. After the first forty eight bits of digitized data passes through the multiplexer in a serial format, the state machine provides a control signal which allows the digitized NRZL video data to pass through the multiplexer. The digitized data is then supplied to a differential line driver which converts the digital data to differential data which is next provided to encryption unit for processing thereby.

DETAILED DESCRIPTION OF THE PREFERRED EMBODIMENT

Figure 1:
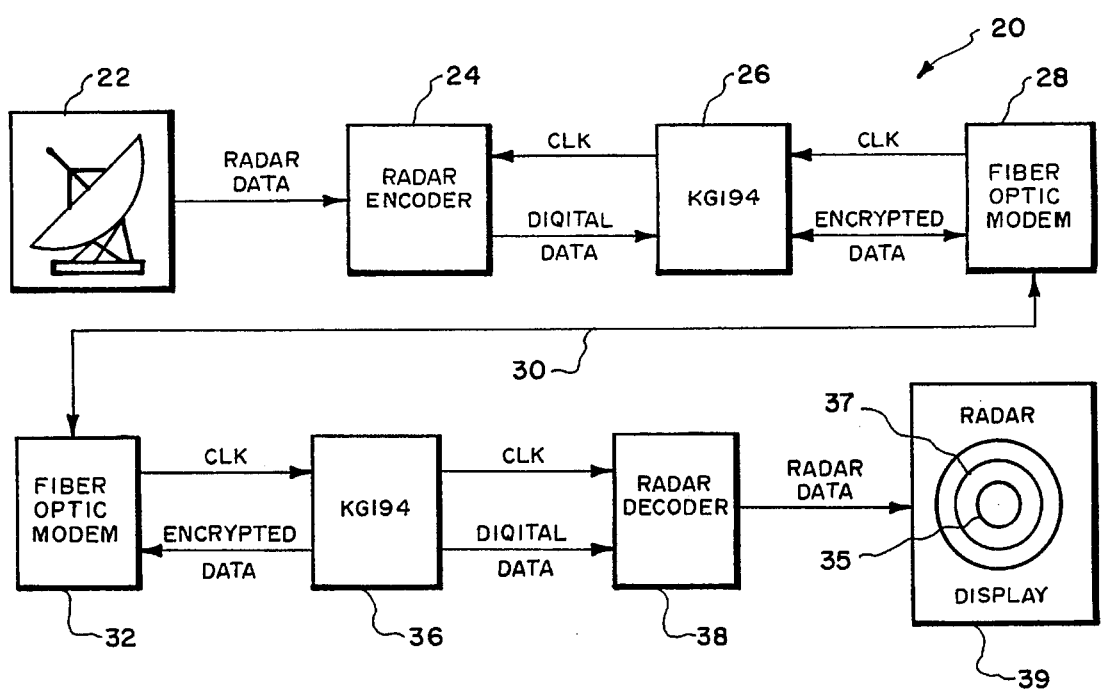
FIG. 1 is a schematic diagram of a communications system which uses a radar encoder to transmit radar video data from a radar to a radar display screen.

Referring first to FIG. 1, there is shown a communications system, designated generally by the reference numeral 20, which is used to transmit radar video data from a ground based radar 22 position at a remote site to a receiving station which is located at a considerable distance from the radar 22. The radar 22 supplies to a radar encoder 24 comprising the present invention radar video data which includes a trigger pulse, azimuth synchro signals and analog radar video data. Encoder 24 utilizes the trigger pulse to generate a frame sync word, digitizes the azimuth synchro signals at the time of occurrence of the sync pulse and then digitizes the analog radar video data. The digitized radar data is then combined by encoder 24 into a serial bit stream.

Encoder 24 digitizes the analog radar video data using Delta Modulation. Delta modulation is a well known modulation technique which uses one bit pulse-code modulation for digitizing an analog signal. In delta modulation, the knowledge of past information is used to simplify the coding technique and the resulting signal format. In delta modulation each bit represents the desired instantaneous slope of a signal which is the integrated encoded signal and corresponds to the input analog signal. Typically, a one of the delta modulation encoded signal represents a positive slop and a zero of the encoded signal represents a negative slop.

The digitized radar data is next supplied to a KG194 encryption unit 26 which is a standard military encoder used for encryption of digital data to be transmitted from a first location to a second location which is a considerable distance from the first location. The encrypted data is supplied to a fiber optic modem 28 which transmits via a pair of fiber optic lines 30 to a fiber optic modem 32 located at the receiving station. The encrypted data is next supplied to a second KG194 encryption unit 36 which un-encrypts the digitized radar video data prior to its being supplied to a radar decoder 38. Radar decoder 38 replicates the radar video data provided by radar 22 prior to supplying the radar video data to a radar display screen 39. Radar video display screen 39 which is located at the receiving station provides a visual sweep of the objects detected by the radar 22 for the user of system 20.

Figure 2A:
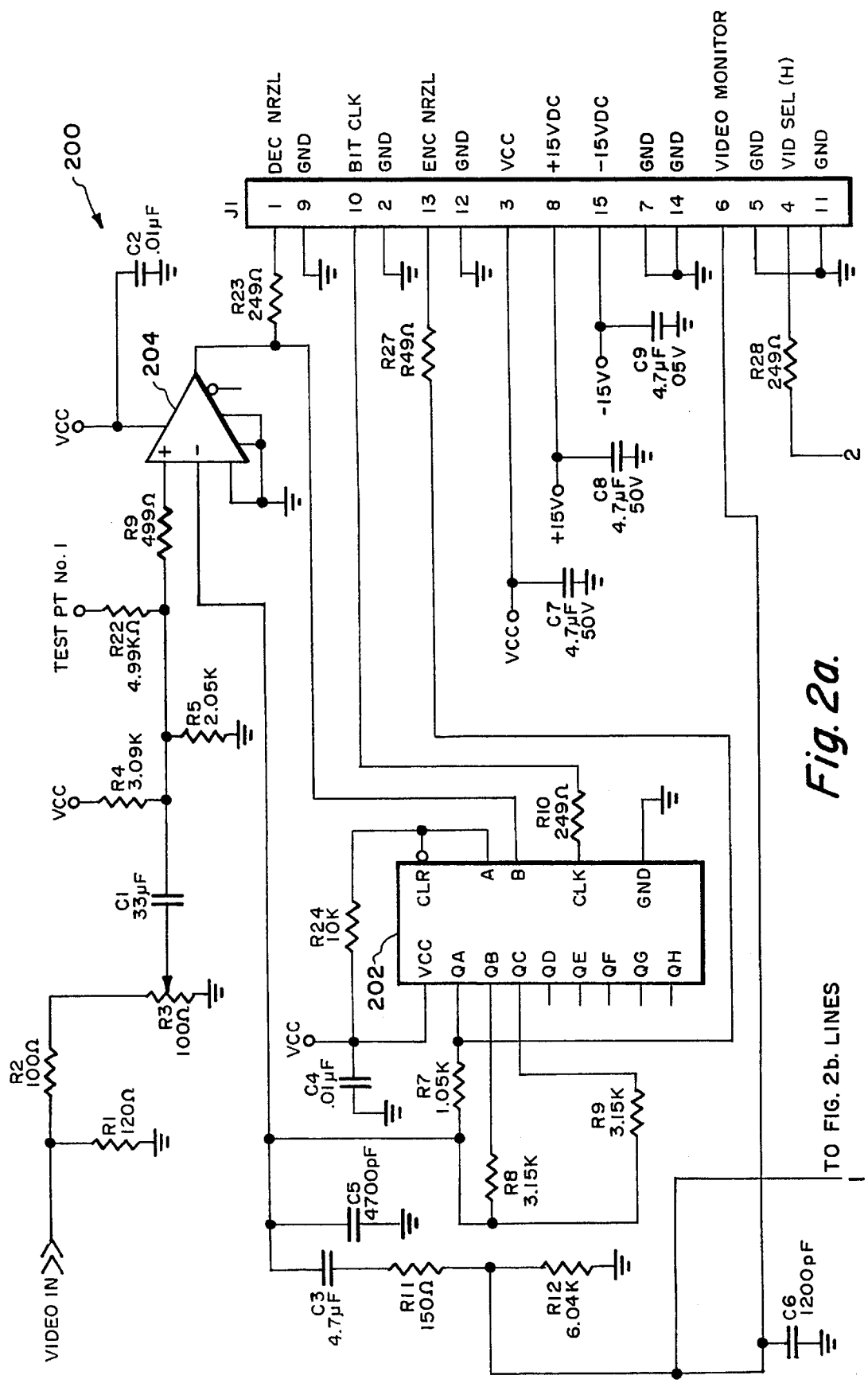
FIGS. 2a and 2b are a detailed electrical schematic diagram of delta modulation circuit used in the preferred embodiment of the present invention.
Figure 2B:
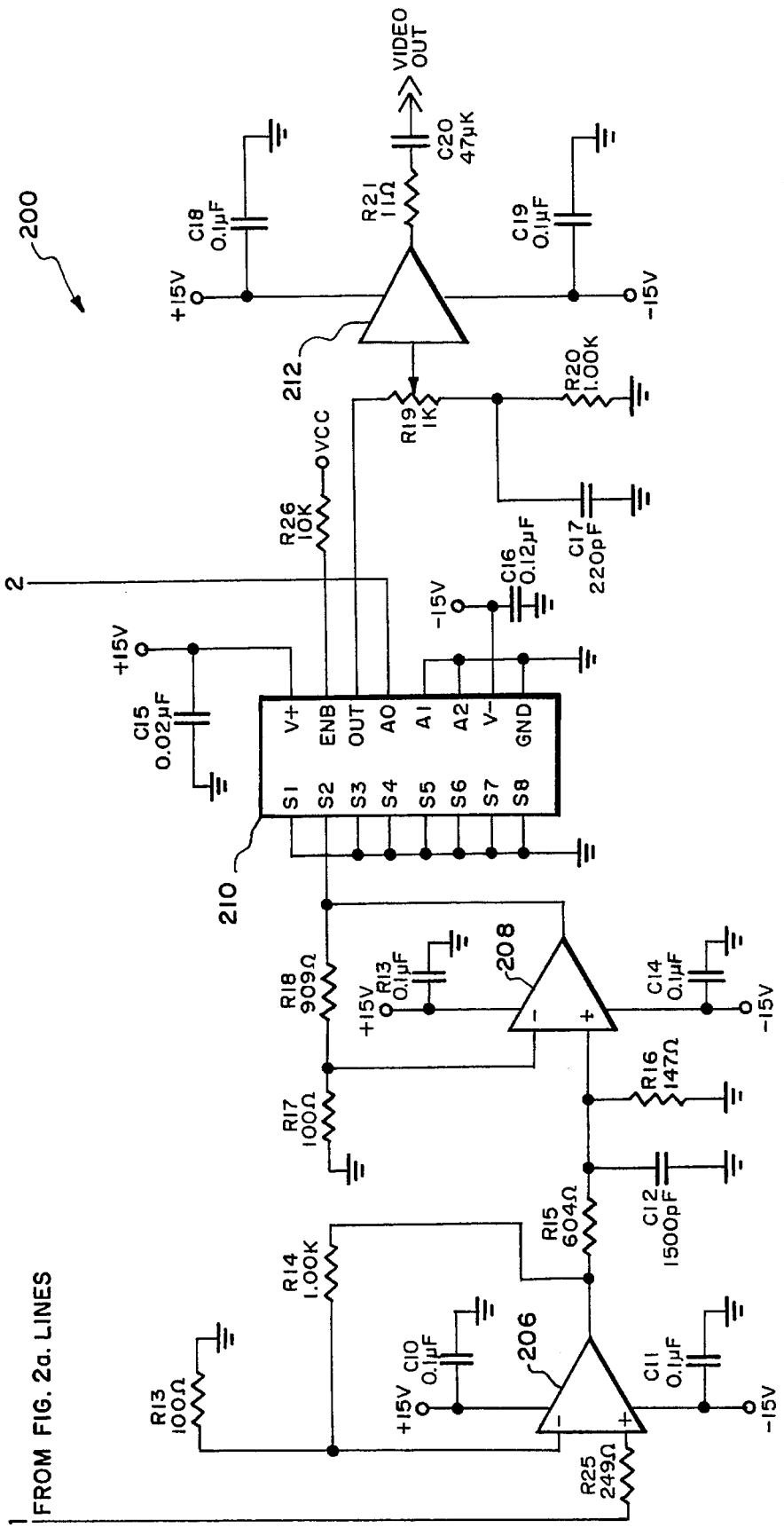
Figure 3A:
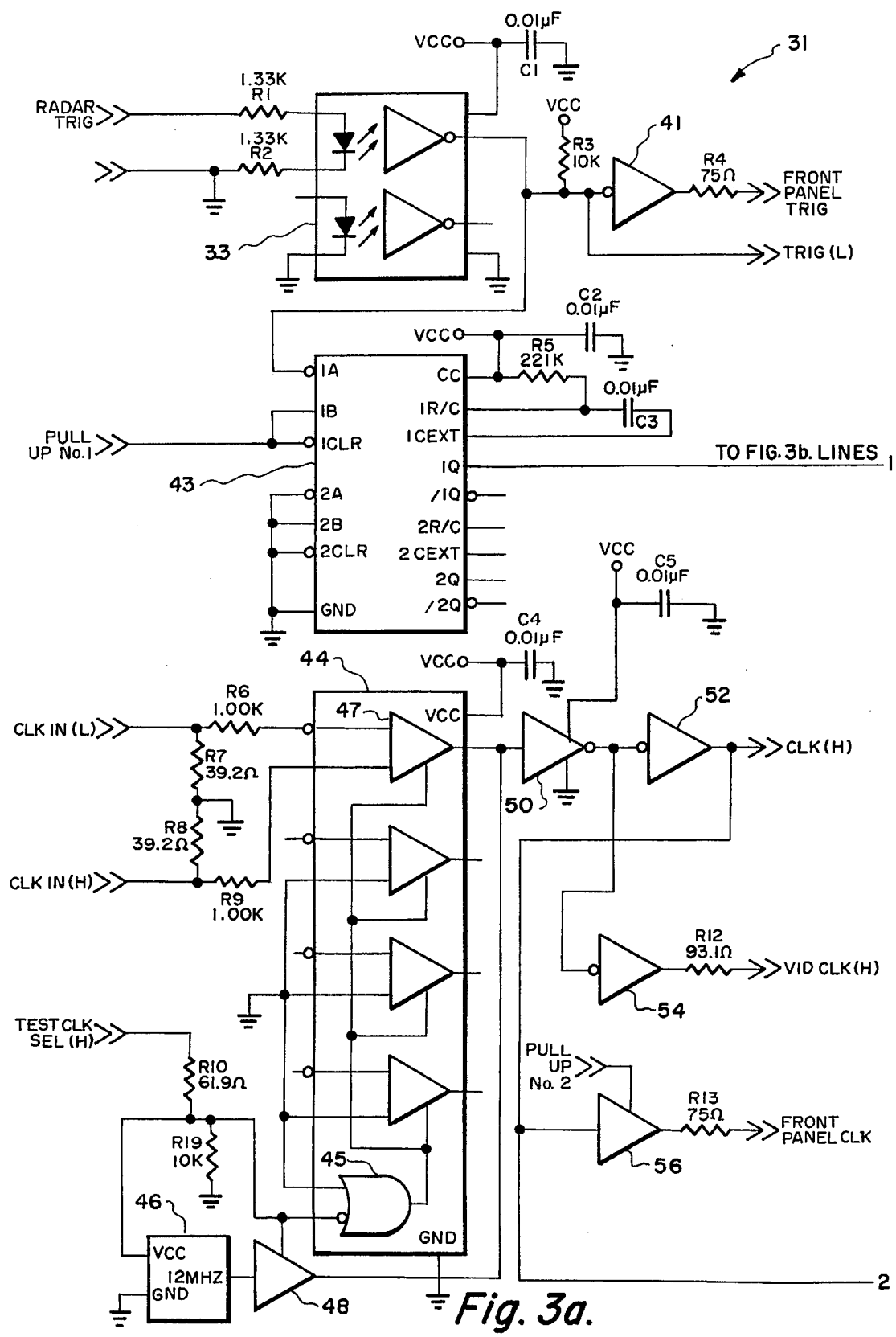
FIGS. 3a, 3b, 3c and 3d are a detailed electrical schematic diagram of the encoder circuit within the radar encoder of FIG. 1.
Figure 3B:
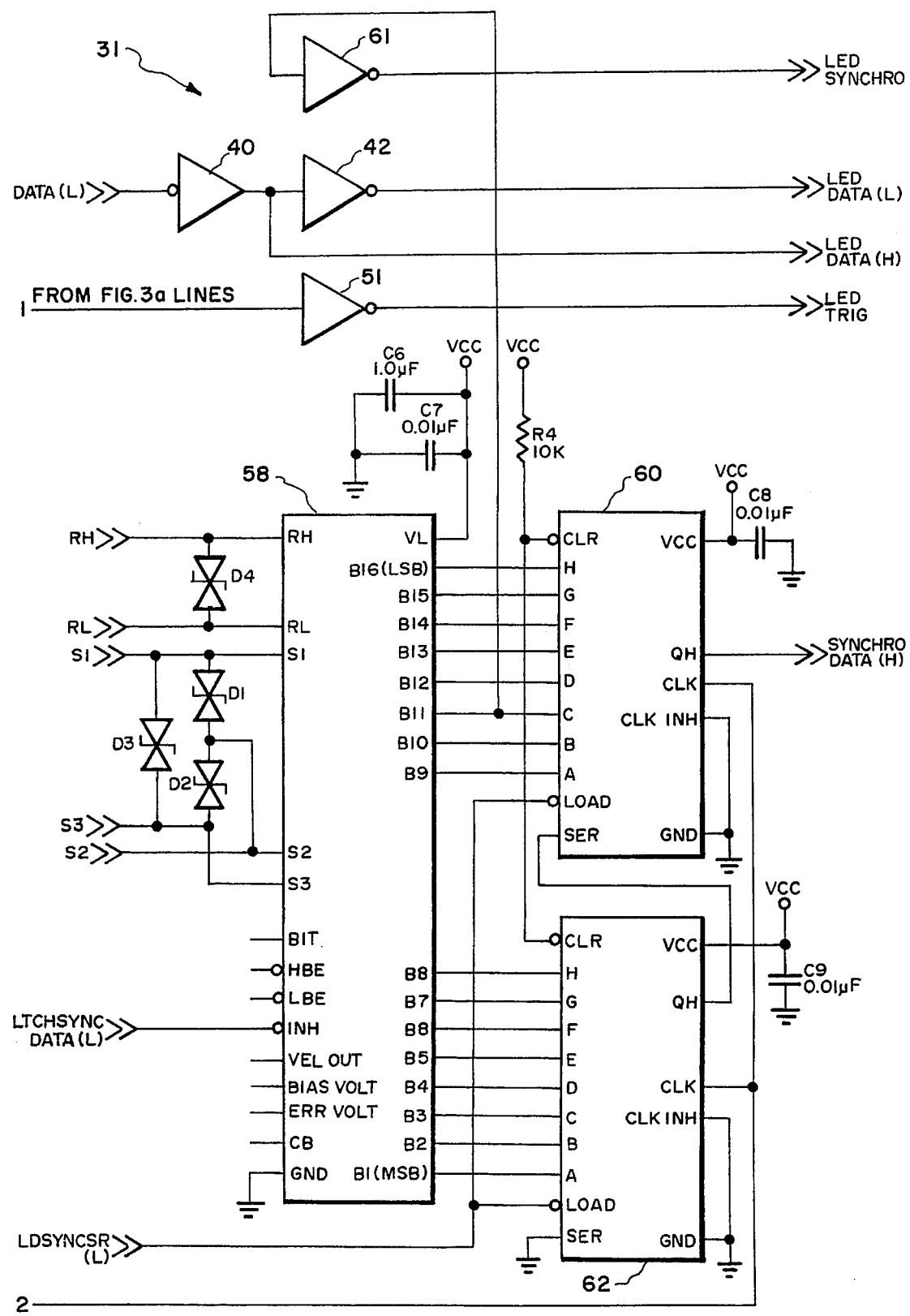
Figure 3C:
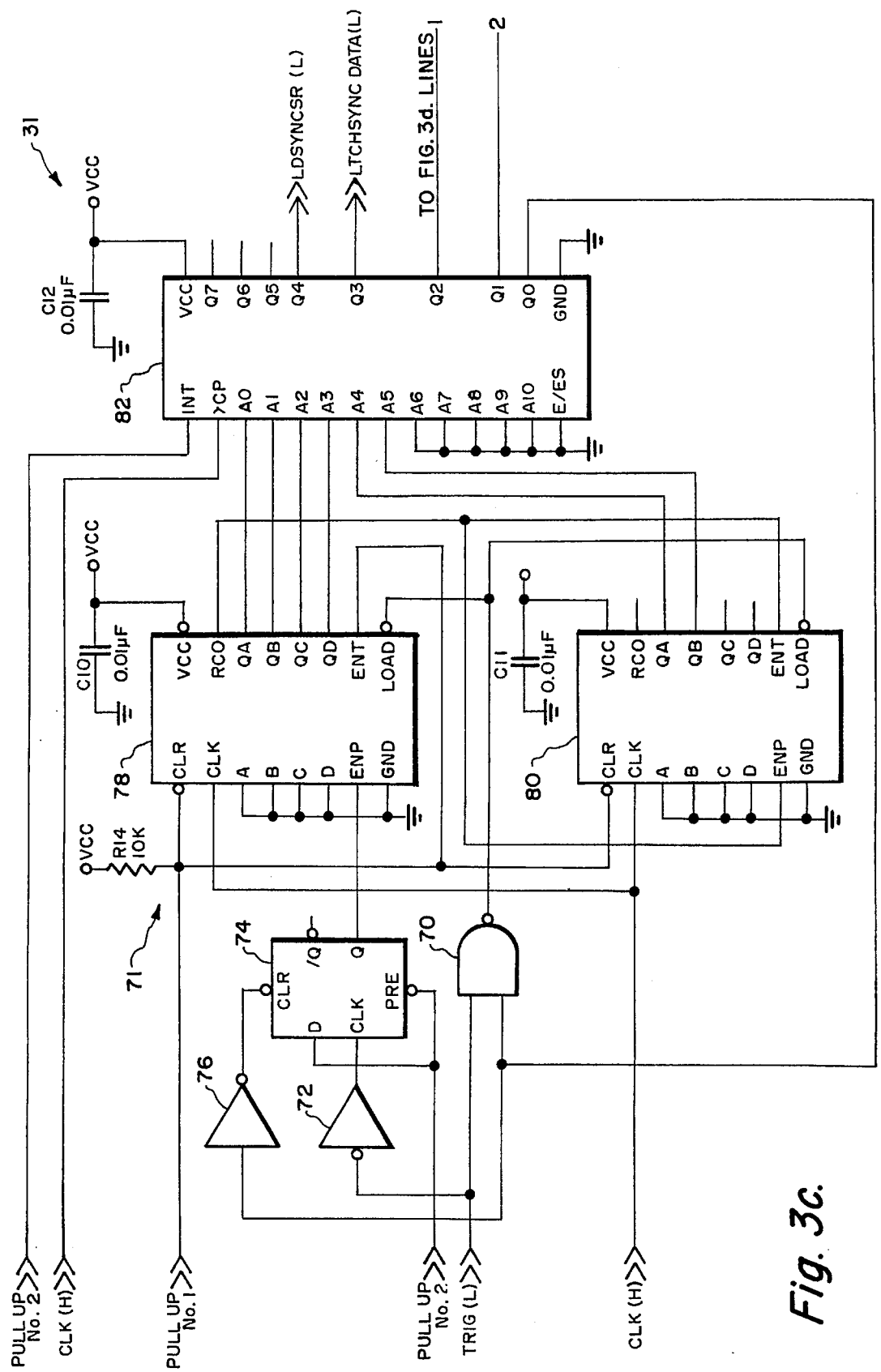
Figure 3D:
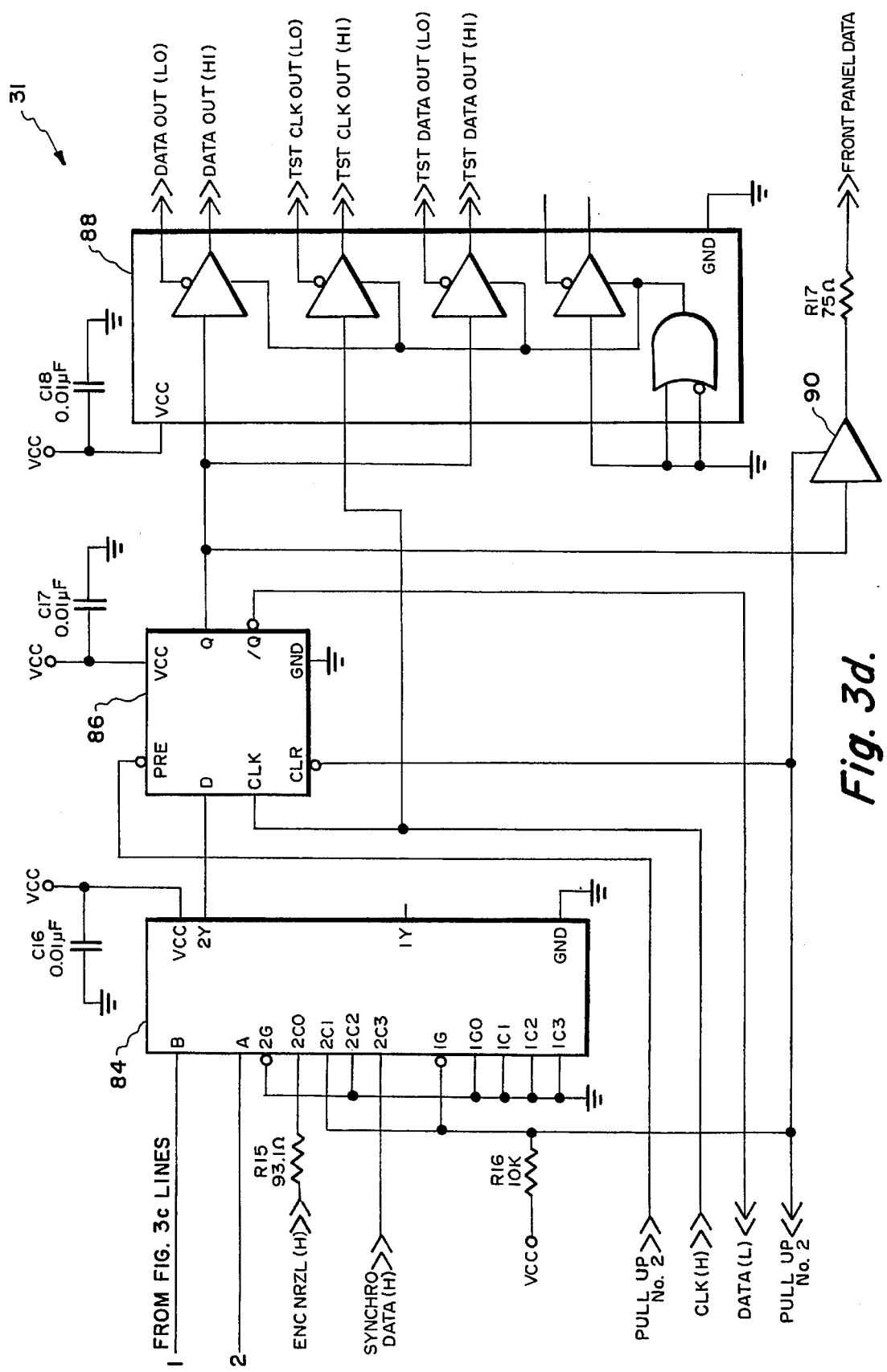

Referring now to FIGS. 1, 2a and 2b, radar video data from radar 22 is supplied to the VIDEO IN input of a delta modulation circuit 200 of radar encoder 24. Resistors R1, R2 and R3 provide a 75 ohm termination at the Video In input to circuit 200. The radar video data signal from radar 22 has a voltage range of about 10 volts peak to peak while the voltage range of the radar video signal supplied to the positive input of comparator 204 is about 1.25 volts to about 3.50 volts peak to peak. Resistor R4 and R5 bias the radar video signal supplied to the positive input of comparator 204 so that the radar video signal is centered within the 1.25–3.50 volts input dynamic range of comparator 204. Resistor R3 allows the voltage range of the radar video signal to be adjusted for compatibility with comparator 204. Capacitor C1 eliminates DC components from the radar video signal. Delta Modulation circuit 200 has a 4.99 Kilo-ohm resistor R22 which protects circuit 200 in the event an operator shorts the test point one input which is an external test point.

The radar video signal is supplied to the positive input of comparator 204. The charging voltage across integrating capacitor C5 is compared with the radar video signal supplied to the positive input of comparator 204 to determine the next bit of the encoded NRZL video data stream. The encoded NRZL video data stream occurring at the QA output of shift register 202 is supplied to the ENC NRZL (H) input of encoder circuit 31 for processing by encoder circuit 31.

Shift register 202 is a component of a delta modulation circuit 200 which has the function of converting the analog radar video signal from radar 22 into the encoded NRZL video data stream occurring at the QA output of shift register 202 for processing by encoder circuit 31. The method used for reconstructing the radar video signal is continuously variable slope delta modulation. This method and its associated circuitry which includes shift register 202, comparator 204, resistor R7, R8 and R9, and integrating capacitor C5 is described in U.S. Pat. No. 4,983,972. The disclosure of U.S. Pat. No. 4,983,972, which issued Jan. 8, 1995 to George T. Mills is incorporated by reference into the disclosure of the present invention. The combination of shift register 202, comparator 204, resistor R7, R8 and R9, and capacitor C5 provide NRZL data stream in the manner described in U.S. Pat. No. 4,983,972. Referring to FIGS. 1 and 3, radar 22 supplies a radar trigger pulse signal having a voltage of about 35 VDC to the RADAR TRIG input of encoder circuit 31 within radar encoder 24. The radar trigger pulse is first supplied to an optical coupler 33 which converts the signal to a digital trigger pulse which is active low. Resistors R1 and R2 of encoder circuit 31, which are 1.33 kilo-ohm resistors, insure that the current requirements for optical coupler 33 are satisfied.

The digital trigger pulse provided by optical encoder 33 is supplied to the 1A input of a retriggerable monostable multivibrator 43 which provides at its 1Q output a pulse having a ten milliseconds pulse width. The ten millisecond time period of the pulse provided by multivibrator 43 is longer than the pulse repetition interval of the radar trigger pulse, thus the signal occurring at the 1Q output of multivibrator 43 will remain at the logic one state as long as radar 22 is supplying a trigger pulse to encoder circuit 31. The logic one pulse occurring at the 1Q output of multivibrator 43 is next supplied to an inverter 51 which inverts the pulse resulting in a logic zero LED TRIG signal which energizes a light emit diode (not illustrated) to indicate to an operator that the radar trigger pulse is being supplied by radar 22 to radar encoder 24. The logic zero trigger pulse occurring at the output of optical coupler 33 is also supplied to the input of an inverter 41 resulting in a front panel trigger signal which may be monitored by the user of radar encoder 24.

Referring to FIGS. 3a, 3b, 3c and 3d, the not Q output of Flip-Flop 86 is connected to an inverter 40 resulting in the digital data signal from multiplexer 84 being inverted by inverter 40 and then being re-inverted by an inverter 42. This, in turn, results in an LED DATA (L) signal and an LED DATA (H) signal which are supplied to a pair of light emitting diodes to indicate to the user of radar encoder 24 that data and a clock signal are being provided by encoder circuit 31. Encoder circuit 31 also includes an inverter 61 which receives one synchro data bit of the sixteen synchro data bits from Synchro-to-Digital Converter 58, inverts the synchro data bit received thereby and then supplies the inverted synchro data bit to a light emitting diode (not illustrated). This inverted bit energizes the light emitting diode indicating to the operator that radar 22 is rotating.

When +5 VDC is supplied to the TEST CLK SEL input of circuit 31 by using a cable to connect VCC to the TEST CLK SEL input of circuit 31, clock signal generator 46 is activated providing at its output a 12 megahertz clock signal which is used for testing. The +5 VDC signal is also supplied to a tri-state buffer 48 enabling buffer 48 allowing the 12 megahertz clock signal to pass through buffer 48. The +5 VDC signal is supplied to the inverting input of an OR gate 45 within a differential line receiver 44 to disable a tri-state buffer 47 within differential line receiver 44. This prevents the 12.624 megahertz differential clock signal provided by encryption unit 26 from being used by encoder circuit 31.

Encoder circuit 31 generates a frame sync word comprising bits FF FF 0F and SS SS 00 (hexadecimal). The frame sync includes the frame sync FF FF 0F, synchro data bits SS SS and eight bits 00 provided at the end of the frame sync word. The sixteen bits SS SS are synchro data provided by the radar 22 to indicate the direction radar 22 is pointing over a range from zero degrees to three hundred sixty degrees. The eight bits 00 (Hexadecimal) are included in the first forty eight bits of digital data to prevent the synchro data from being interpreted as the sixteen bits FF FF of the frame sync word whenever the synchro data bits SS SS are logic ones.

A programmed read only memory 82 provides at its Q1 and Q2 outputs respectively an OUTMUXSELB signal and an OUTMUXSELA signal. The OUTMUXSELB and OUTMUXSELA signals are supplied to a dual four line to one line data multiplexer 84 to allow the signal occurring at the 2C0, 2C1, 2C2 or 2C3 input of multiplexer 84 to its 2Y output. When the A and B inputs of multiplexer 84 are at the logic zero state the encoded NRZL video data will pass through multiplexer 84. When the A and B inputs of multiplexer 84 are at the logic one state synchro data will pass through multiplexer 84. When the B input of multiplexer 84 is at the logic zero state and the A input of multiplexer 84 is at the logic one state +5 VDC, that is a logic one, will pass through multiplexer 84. When the B input of multiplexer 84 is at the logic one state and the A input of multiplexer 84 is at the logic zero state zero volts, that is a logic zero, will pass through multiplexer 84. The digital bit stream occurring at the 2Y output of multiplexer 84 is supplied to the D input of a D-type Flip-Flop 86 and then clocked through Flip-Flop 86 to its Q output by the 12.624 megahertz clock signal from encryption unit 26 or other selected clock signal which is provided to the clock input of Flip-Flop 86. The digital data is next supplied to a differential line driver 88 which converts the digital data to differential data which is next provided to encryption unit 26 for processing thereby.

At this time it should be noted that the differential line receiver 44 and the differential line driver 88 used in the preferred embodiment are each commercially available from National Semiconductor Corporation of Santa Clara, Calif. and are respectively Models DS26LS32C Quad Differential Line Receiver and DS26LS31C Quad Differential Line Driver. In addition, the Synchro-to-Digital Converter 58 used in the preferred embodiment is a Model HDSR2006 Digital-to-Synchro/Resolver Converter Microprocessor Compatible 16-bit Hybrid commercially available from NATAL Engineering Co. Inc. of Simi Valley, Calif., while the programmed read only memory 82 is a Model CY7C245A Reprogrammable 2048×8 Registered PROM commercially available from Cypress Semiconductor Corporation of San Jose, Calif.

The serial bit stream provided at the 2Y output of multiplexer has the following hexadecimal bit pattern: "FF FF 0F SS SS 00 Vd Vd Vd Vd ... " where the bits SS SS are the 16 serial synchro data bits and Vd represents digitized NRZL radar video data from radar 22. A state machine 71 which includes programmed read only memory 82 as well as synchronous 4-bit counters 78 and 80, D-type Flip-flop 74, NAND gate 70 and inverters 72 and 76 provides the control signals OUTMUXSELB and OUTMUXSELA for multiplexer 84 and the control signals LAST STATE, LDSYNCSR and LTCHSYNC DATA.

The LTCHSYNC DATA control signal, which is active low, will cause Synchro-to-Digital Converter 58 to measure the analog sine and cosine voltages at the S1, S2 and S3 inputs of Synchro-to-Digital Converter 58, convert the measured analog voltages to sixteen digital data bits which are then latched into converter 58 and provide at its B1–B16 outputs the sixteen bits of synchro data. The LDSYNCSR control signal, which is also active low, is supplied to the LOAD inputs of shift registers 60 and 62 will parallel load the sixteen bits of synchro bits into shift registers 60 and 62. The 12.624 megahertz clock signal or other selected clock signal which is supplied to the clock inputs of shift registers 60 and 62 via inverter 52 clocks the sixteen bits of synchro bits out of shift registers 60 and 62 to the 2C3 input of multiplexer 84.

Counters 78 and 80 provide a six bit address to programmed read only memory 82. As is best illustrated in Appendix A when the address supplied to the A0–A5 inputs of programmed read only memory 82 is hexadecimal 30 the Q0 output of memory 82 (LAST STATE HIGH control signal) will transition to the logic one state and remain at the logic one state when the address supplied to the A0–A5 inputs of programmed read only memory 82 is hexadecimal 31. When the trigger pulse signal from radar 22 is at the logic one state and the LAST STATE control signal is at a logic one a logic zero will result at the output of NAND gate 70. The logic zero occurring at the output of NAND gate 70 is supplied to the LOAD inputs of counters 78 and 80 loading counters 78 and 80 with a binary count of zero. The LAST STATE control signal now transition to a logic zero when programmed read only memory 82 is in hexadecimal states 30 and 31.

The active high LAST STATE control signal is also supplied to an inverter 76 which inverts the signal resulting in a logic zero at the output of inverter 76. This logic zero is supplied to the clear input of a D-Type Flip-Flop 74 clearing the Q output of Flip-Flop 74 to the logic zero state. The logic zero now occurring at the Q output of Flip-Flop 74 is supplied to the ENP input of counter 78 disabling counter 78.

Counter 78 is again enabled to count when the trigger pulse signal transitions from the logic one state to the logic zero state. Inverter 72 inverts this transition resulting in a logic zero to one transition being provided to the clock input of Flip-Flop 74 which clocks the +5 VDC signal (logic one) at the D input of Flip-Flop 74 to its Q output. The logic one now at the Q output of Flip-Flop 74 is supplied to the ENP input of counter 78 enabling counter 78 so that counters 78 and 80 may begin a new count and thereby provide addressing to programmed read only memory 82. The 12.624 megahertz clock signal or other selected clock signal is supplied to the clock inputs of counters 78 and 80 via inverter 52 incrementing counters 78 and 80.

When another trigger pulse is supplied to state machine 71 counters 78 and 80 are again enabled allowing counters 78 and 80 to supply hexadecimal addresses to programmed read only memory 82. At hexadecimal address 001 the Q3 output of programmed read only memory 82 transitions to a logic zero which is supplied to the INH input of Synchro-to-Digital Converter 58. The logic zero occurring at the INH input of Synchro-to-Digital Converter 58 latches the sixteen synchro data bits into Synchro-to-Digital Converter 58. The synchro data bits remain latched into Synchro-to-Digital Converter 58 until the address supplied to programmed read only memory 82 by counters is hexadecimal 01D. When counters 78 and 80 supply hexadecimal addresses 017 and 018 to programmed read only memory 82, the Q4 output of programmed read only memory 82 transitions to a logic zero which is supplied to the LOAD inputs of shift registers 60 and 62. The logic zero occurring at the LOAD inputs of shift registers 60 and 62 causes shift registers 60 and 62 to parallel load the sixteen synchro data bits from Synchro-to-Digital Converter 58 into shift registers 60 and 62. The clock signal than clocks the synchro data bits from shift registers 60 and 62 to multiplexer 84 beginning at hexadecimal address 019.

As is best illustrated by Appendix A when the address supplied by counters 78 and 80 to programmed read only memory 82 is hexadecimal 001 the OUTMUXSELA control signal is at the logic one state and the OUTMUXSELB control signal is at the logic zero state resulting in a logic one at the A input of multiplexer 84 and a logic zero at the B input of multiplexer 84. This allows the +5 VDC signal at the 2C1 input of multiplexer 84 to pass through multiplexer 84 resulting in a logic one at the 2Y output of multiplexer 84. From hexadecimal addresses 001 through 010, the OUTMUXSELA control signal will stay at the logic one state and the OUTMUXSELB control signal is will stay at the logic zero state resulting in sixteen logic ones appearing at the 2Y output of multiplexer 84.

When the address supplied by counters 78 and 80 to programmed read only memory 82 is hexadecimal 011 the OUTMUXSELA control signal is at the logic zero state and the OUTMUXSELB control signal is at the logic one state resulting in a logic zero at the A input of multiplexer 84 and a logic one at the B input of multiplexer 84. This allows the zero volt signal at the 2C2 input of multiplexer 84 to pass through multiplexer 84 resulting in a logic zero at the 2Y output of multiplexer 84. From hexadecimal addresses 011 through 014, the OUTMUXSELA control signal will stay at the logic zero state and the OUTMUXSELB control signal is will stay at the logic one state resulting in four logic zeros appearing at the 2Y output of multiplexer 84.

From hexadecimal addresses 015 through 018, the OUTMUXSELA control signal will again be at the logic one state and the OUTMUXSELB control signal is will again be at the logic zero state resulting in four logic ones appearing at the 2Y output of multiplexer 84. Further, as discussed above, in hexadecimal states 017 and 018 the synchro data is made ready for transmission.

When the address supplied by counters 78 and 80 to programmed read only memory 82 is hexadecimal 019 the OUTMUXSELA control signal and the OUTMUXSELB control signal are both at the logic one state resulting in logic ones at the A and B inputs of multiplexer 84. This allows the first of sixteen synchro data bits at the 2C3 input of multiplexer 84 to pass through multiplexer 84 to its 2Y output. The remaining fifteen synchro data bits will pass through multiplexer 84 during hexadecimal addresses 01A-028 since the OUTMUXSELA control signal and the OUTMUXSELB control signal remain at the logic one state.

From hexadecimal address 029 through hexadecimal address 030 the OUTMUXSELA control signal is at the logic zero state and the OUTMUXSELB control signal is at the logic one state resulting in a logic zero at the A input of multiplexer 84 and a logic one at the B input of multiplexer 84. This allows the zero volt signal at the 2C2 input of multiplexer 84 to pass through multiplexer 84 resulting in eight logic zeros at the 2Y output of multiplexer 84.

When the address supplied by counters 78 and 80 to programmed read only memory 82 is hexadecimal 031 the OUTMUXSELA control signal and the OUTMUXSELB control signal are both at the logic zero state resulting in logic zeros at the A and B inputs of multiplexer 84. This, in turn, allows the digitized NRZL radar video data supplied to the 2C0 input of multiplexer 84 to pass through multiplexer 84 to its 2Y output and then through Flip-Flip 86 to differential line driver 88.

Until another trigger sync pulse is supplied to state machine 71 the OUTMUXSELA control signal and the OUTMUXSELB control signal will remain at the logic zero state allowing digitized NRZL radar video data supplied to the 2C0 input of multiplexer 84 to pass through multiplexer 84 to its 2Y output and then through Flip-Flip 86 to differential line driver 88. Whenever an active low trigger pulse is supplied to state machine 71 counter 78 is again enabled allowing counters 78 and 80 to provide addressing to programmed read only memory 82.

At this time it should be noted that the multiplexer 84 used in the preferred embodiment is a Model 54HC153 Dual 4-Line to 1-Line Data Selector/Multiplexer commercially available from Texas Instruments of Dallas, Tex.; Counters 78 and 80 are Model 54HC161 Synchronous Binary Counters commercially available from Texas Instruments; multivibrator 43 is a Model 54HC123 retriggerable monostable multivibrator and shift registers 60 and 62 are Model 54HCT166 Parallel Load 8-Bit Shift Registers commercially available from several sources including Texas Instruments.

Obviously, many modifications and variations of the present invention are possible in light of the above teachings. It is, therefore, to be understood that the present invention may be practiced within the scope of the following claims other than as specifically described herein.

Appendix A

| ADDRESS FOR PROM 82 | | DATA VALUE (BINARY OUTPUT OF PROM 82) | | | | | | | | |
|---|---|---|---|---|---|---|---|---|---|---|
| (DEC) | (HEX) | Q7 | Q6 | Q5 | Q4 | Q3 | Q2 | Q1 | Q0 | HEX |
| 0 | 000 | 0 | 0 | 1 | 1 | 1 | 0 | 0 | 0 | 38 |
| 1 | 001 | 0 | 0 | 0 | 1 | 0 | 0 | 1 | 0 | 12 |
| 2 | 002 | 0 | 0 | 0 | 1 | 0 | 0 | 1 | 0 | 12 |
| 3 | 003 | 0 | 0 | 0 | 1 | 0 | 0 | 1 | 0 | 12 |
| 4 | 004 | 0 | 0 | 0 | 1 | 0 | 0 | 1 | 0 | 12 |
| 5 | 005 | 0 | 0 | 0 | 1 | 0 | 0 | 1 | 0 | 12 |
| 6 | 006 | 0 | 0 | 0 | 1 | 0 | 0 | 1 | 0 | 12 |
| 7 | 007 | 0 | 0 | 0 | 1 | 0 | 0 | 1 | 0 | 12 |
| 8 | 008 | 0 | 0 | 0 | 1 | 0 | 0 | 1 | 0 | 12 |
| 9 | 009 | 0 | 0 | 0 | 1 | 0 | 0 | 1 | 0 | 12 |
| 10 | 00A | 0 | 0 | 0 | 1 | 0 | 0 | 1 | 0 | 12 |
| 11 | 00B | 0 | 0 | 0 | 1 | 0 | 0 | 1 | 0 | 12 |
| 12 | 00C | 0 | 0 | 0 | 1 | 0 | 0 | 1 | 0 | 12 |
| 13 | 00D | 0 | 0 | 0 | 1 | 0 | 0 | 1 | 0 | 12 |
| 14 | 00E | 0 | 0 | 0 | 1 | 0 | 0 | 1 | 0 | 12 |
| 15 | 00F | 0 | 0 | 0 | 1 | 0 | 0 | 1 | 0 | 12 |
| 16 | 010 | 0 | 0 | 0 | 1 | 0 | 0 | 1 | 0 | 12 |
| 17 | 011 | 0 | 0 | 0 | 1 | 0 | 1 | 0 | 0 | 14 |
| 18 | 012 | 0 | 0 | 0 | 1 | 0 | 1 | 0 | 0 | 14 |
| 19 | 013 | 0 | 0 | 0 | 1 | 0 | 1 | 0 | 0 | 14 |
| 20 | 014 | 0 | 0 | 0 | 1 | 0 | 1 | 0 | 0 | 14 |
| 21 | 015 | 0 | 0 | 0 | 1 | 0 | 0 | 1 | 0 | 12 |
| 22 | 016 | 0 | 0 | 0 | 1 | 0 | 0 | 1 | 0 | 12 |
| 23 | 017 | 0 | 0 | 0 | 0 | 0 | 0 | 1 | 0 | 02 |
| 24 | 018 | 0 | 0 | 0 | 0 | 0 | 0 | 1 | 0 | 02 |
| 25 | 019 | 0 | 0 | 0 | 1 | 0 | 1 | 1 | 0 | 16 |
| 26 | 01A | 0 | 0 | 0 | 1 | 0 | 1 | 1 | 0 | 16 |
| 27 | 01B | 0 | 0 | 0 | 1 | 0 | 1 | 1 | 0 | 16 |
| 28 | 01C | 0 | 0 | 0 | 1 | 0 | 1 | 1 | 0 | 16 |
| 29 | 01D | 0 | 0 | 0 | 1 | 1 | 1 | 1 | 0 | 1E |

| ADDRESS | | DATA VALUE (BINARY OUTPUT OF EEPROM) | | | | | | | | |
|---|---|---|---|---|---|---|---|---|---|---|
| (DEC) | (HEX) | Q7 | Q6 | Q5 | Q4 | Q3 | Q2 | Q1 | Q0 | HEX |
| 30 | 01E | 0 | 0 | 0 | 1 | 1 | 1 | 1 | 0 | 1E |
| 31 | 01F | 0 | 0 | 0 | 1 | 1 | 1 | 1 | 0 | 1E |
| 32 | 020 | 0 | 0 | 0 | 1 | 1 | 1 | 1 | 0 | 1E |
| 33 | 021 | 0 | 0 | 0 | 1 | 1 | 1 | 1 | 0 | 1E |
| 34 | 022 | 0 | 0 | 0 | 1 | 1 | 1 | 1 | 0 | 1E |
| 35 | 023 | 0 | 0 | 0 | 1 | 1 | 1 | 1 | 0 | 1E |
| 36 | 024 | 0 | 0 | 0 | 1 | 1 | 1 | 1 | 0 | 1E |
| 37 | 025 | 0 | 0 | 0 | 1 | 1 | 1 | 1 | 0 | 1E |
| 38 | 026 | 0 | 0 | 0 | 1 | 1 | 1 | 1 | 0 | 1E |
| 39 | 027 | 0 | 0 | 0 | 1 | 1 | 1 | 1 | 0 | 1E |
| 40 | 028 | 0 | 0 | 0 | 1 | 1 | 1 | 1 | 0 | 1E |
| 41 | 029 | 0 | 0 | 0 | 1 | 1 | 1 | 0 | 0 | 1C |
| 42 | 02A | 0 | 0 | 0 | 1 | 1 | 1 | 0 | 0 | 1C |
| 43 | 02B | 0 | 0 | 0 | 1 | 1 | 1 | 0 | 0 | 1C |
| 44 | 02C | 0 | 0 | 0 | 1 | 1 | 1 | 0 | 0 | 1C |
| 45 | 02D | 0 | 0 | 0 | 1 | 1 | 1 | 0 | 0 | 1C |
| 46 | 02E | 0 | 0 | 0 | 1 | 1 | 1 | 0 | 0 | 1C |
| 47 | 02F | 0 | 0 | 0 | 1 | 1 | 1 | 0 | 0 | 1C |
| 48 | 030 | 0 | 0 | 0 | 1 | 1 | 1 | 0 | 1 | 1D |
| 49 | 031 | 0 | 0 | 0 | 1 | 1 | 0 | 0 | 1 | 19 |

What is claimed is:

1. A radar data encoder for generating a serial digital data stream, said radar data encoder comprising:
   modulation means having a video input for receiving analog radar video data from a remote site radar, said delta modulation circuit converting said analog radar video data to digital radar video data;

optical coupling means having an input for receiving a radar trigger pulse signal from said remote site radar, said optical coupling means converting said radar trigger pulse signal to a digital pulse signal;

control signal generating means connected to said optical coupling means for receiving said digital pulse signal from said optical coupling means, said control signal generating means, in response to said trigger pulse circuit generating at least six control signals;

converter means having a plurality of data inputs for receiving analog synchro data signals from said remote site radar, a latch data input connected to said control signal generating means for receiving a first of said six control signals, said converter means converting said analog synchro data signals to digital synchro data, said converter means, responsive to said first of said six control signals latching therein said digital synchro data;

shift register means connected to said converter means for receiving said digital synchro data in a parallel format from said converter means;

said shift register means being connected to said control signal generating means for receiving a second of six control signals, said shift register means, responsive to said second of said six control signals loading said digital synchro data therein;

said shift register means converting said digital synchro data from said parallel format to a serial format; and multiplexer means connected to said shift register for receiving said digital synchro data, said modulation means for receiving said digital radar video data and said control signal generating means for receiving a third, a fourth, a fifth and a sixth control signal of said six control signals, said multiplexer means, responsive to said third, said fourth, said fifth and said sixth of said six control signals forming said serial digital data stream.

2. The radar data encoder of claim 1 wherein said modulation means comprises:

a variable resistor having a first terminal for receiving said analog radar video data, a second terminal connected to ground and a third terminal, a first capacitor having a first terminal connected to the third terminal of said variable resistor and a second terminal;

a voltage source having an output;

a first fixed resistor having a first terminal connected to the output of said voltage source and a second terminal connected to the second terminal of said first capacitor;

a second fixed resistor having a first terminal connected to ground and a second terminal connected to the second terminal of said first capacitor;

a comparator having a positive input connected to the second terminal of said first capacitor, a negative input and an output;

a shift register having a data input connected to the output of said comparator, a clock input for receiving an external clock signal and first, second and third outputs;

a third fixed resistor having a first terminal connected to the first output of said shift register and a second terminal connected to the negative input of said comparator;

a fourth fixed resistor having a first terminal connected to the second output of said shift register and a second terminal connected to the negative input of said comparator;

a fifth fixed resistor having a first terminal connected to the third output of said shift register and a second terminal connected to the negative input of said comparator; and a second capacitor having a first terminal connected to the negative input of said comparator and a second terminal connected to ground.

3. The radar data encoder of claim 1 wherein said control signal generating means comprises:

a first inverter having an input connected to said optical coupling means for receiving said digital pulse signal and an output;

a Flip-Flop having a data input for receiving a logic one signal, a clock input connected to the output of said first inverter, a clear input and a Q output;

an eight bit binary counter having eight data inputs connected to ground, an enable input connected to the Q output of said Flip-Flop, a clock input for receiving an external clock signal, a load input and six data outputs;

a programmed read only memory having six address inputs connected to the six data outputs of said eight bit binary counter, a clock input for receiving said external clock signal and five control signal outputs, the five control signal outputs of said programmed read only memory providing said at least six control signals;

a second inverter having an input connected to a last state bit control signal output of the five control signal outputs of said programmed read only memory and an output connected to the clear input of said Flip-Flop; and a NAND gate having a first input connected to said optical coupling means for receiving said digital pulse signal, a second input connected to the last state bit control signal output of the seven control signal outputs of said programmed read only memory and an output connected to the load input of eight bit binary counter.

4. The radar data encoder of claim 3 wherein said eight bit binary counter comprises a first and second synchronous 4-bit binary counters.

5. The radar data encoder of claim 4 wherein said converter means comprises a synchro-to-digital converter.

6. The radar data encoder of claim 1 wherein said shift register means comprises a pair of parallel load 8-bit shift registers.

7. The radar data encoder of claim 1 wherein said multiplexer means comprises a 4-line to 1-line data selector.

8. The radar data encoder of claim 1 further comprising a D-type Flip-Flop having a data input connected to said multiplexer means, a clock input for receiving an external clock signal and a data output.

9. The radar data encoder of claim 8 further comprising a differential line driver having an input connected to the data output of said D-type Flip-Flop.

10. The radar encoder of claim 1 further comprising a test clock signal generator connected to said optical coupling means for providing a twelve megahertz test clock signal to said radar data encoder.

11. A radar data encoder for generating a serial digital data stream, said radar data encoder comprising:

a delta modulation circuit having a video input for receiving analog radar video data from a remote site radar, said delta modulation circuit converting said analog radar video data to digital radar video data;

an optical coupler having an input for receiving a radar trigger pulse signal from said remote site radar, said optical coupler converting said radar trigger pulse signal to a digital pulse signal;

a state machine circuit connected to said optical coupler for receiving said digital pulse signal from said optical coupler, said state machine circuit in response to said trigger pulse circuit generating at least six control signals;

a synchro-to-digital converter having a plurality of data inputs for receiving analog synchro data signals from said remote site radar, a latch data input connected to said state machine for receiving a first of said six control signals, said synchro-to-digital converter converting said analog synchro data signals to digital synchro data;

said synchro-to-digital converter, responsive to said first of said six control signals latching therein said digital synchro data;

a parallel to serial shift register connected to said synchro-to-digital converter for receiving said digital synchro data in a parallel format and said state machine circuit for receiving a second of six control signals, said parallel to serial shift register, responsive to said second of said six control signals loading said digital synchro data therein;

said parallel to serial shift register converting said digital synchro data from said parallel format to a serial format; and a multiplexer connected to said parallel to serial shift register for receiving said digital synchro data, said delta modulation circuit for receiving digital radar video data and said state machine for receiving a third, a fourth, a fifth and a sixth control signal of said six control signals, said multiplexer, responsive to said third, said fourth, said fifth and said sixth of said six control signals forming said serial digital data stream.

12. The radar data encoder of claim 11 wherein said digital radar video data comprises Non-Return-To-Zero-Level Video Data.

13. The radar data encoder of claim 11 wherein said delta modulation circuit comprises:

a variable resistor having a first terminal for receiving said analog radar video data, a second terminal connected to ground and a third terminal, a first capacitor having a first terminal connected to the third terminal of said variable resistor and a second terminal;

a voltage source having an output;

a first fixed resistor having a first terminal connected to the output of said voltage source and a second terminal connected to the second terminal of said first capacitor;

a second fixed resistor having a first terminal connected to ground and a second terminal connected to the second terminal of said first capacitor;

a comparator having a positive input connected to the second terminal of said first capacitor, a negative input and an output;

a shift register having a data input connected to the output of said comparator, a clock input for receiving an external clock signal and first, second and third outputs;

a third fixed resistor having a first terminal connected to the first output of said shift register and a second terminal connected to the negative input of said comparator;

a fourth fixed resistor having a first terminal connected to the second output of said shift register and a second terminal connected to the negative input of said comparator;

a fifth fixed resistor having a first terminal connected to the third output of said shift register and a second terminal connected to the negative input of said comparator; and a second capacitor having a first terminal connected to the negative input of said comparator and a second terminal connected to ground.

14. The radar data encoder of claim 11 wherein said state machine circuit comprises:

a first inverter having an input connected to said optical coupler for receiving said digital pulse signal and an output;

a Flip-Flop having a data input for receiving a logic one signal, a clock input connected to the output of said first inverter, a clear input and a Q output;

an eight bit binary counter having eight data inputs connected to ground, an enable input connected to the Q output of said Flip-Flop, a clock input for receiving an external clock signal, a load input and six data outputs;

a programmed read only memory having six address inputs connected to the six data outputs of said eight bit binary counter, a clock input for receiving said external clock signal and five control signal outputs, the five control signal outputs of said programmed read only memory providing said at least six control signals;

a second inverter having an input connected to a last state bit control signal output of the five control signal outputs of said programmed read only memory and an output connected to the clear input of said Flip-Flop; and a NAND gate having a first input connected to said optical coupler for receiving said digital pulse signal, a second input connected to the last state bit control signal output of the seven control signal outputs of said programmed read only memory and an output connected to the load input of eight bit binary counter.

15. The radar data encoder of claim 11 wherein said eight bit binary counter comprises a first and second synchronous 4-bit binary counters.

16. The radar data encoder of claim 11 wherein said parallel to serial shift register comprises a pair of parallel load 8-bit shift registers.

17. The radar data encoder of claim 11 further comprising a D-type Flip-Flop having a data input connected to said multiplexer, a clock input for receiving an external clock signal and a data output.

18. The radar data encoder of claim 17 further comprising a differential line driver having an input connected to the data output of said D-type Flip-Flop.

19. The radar encoder of claim 18 wherein said serial digital data stream comprises a synch word having twenty logic ones and four logic zeros followed by said digital synchro data, eight additional logic zeros and said digital radar video data.

20. The radar encoder of claim 11 further comprising a test clock signal generator connected to said optical coupler for providing a twelve megahertz test clock signal to said radar data encoder.

* * * * *